Sept. 5, 1933.  N. STRAUSSLER  1,925,614
COMBUSTION ENGINE
Filed Sept. 22, 1930  2 Sheets-Sheet 1

INVENTOR
*Nicholas Straussler.*
BY *F. B. Smith*
ATTORNEY

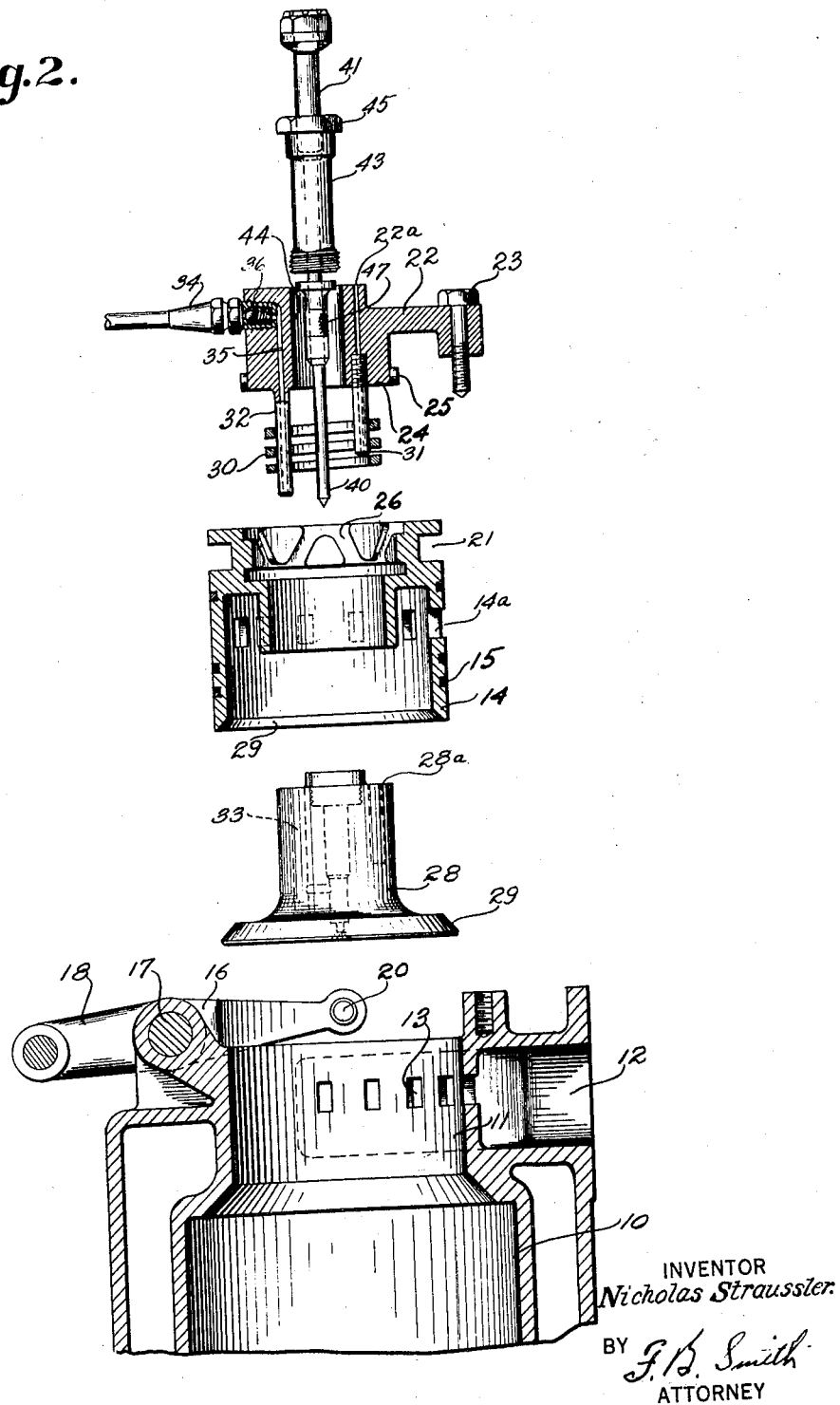

Patented Sept. 5, 1933

1,925,614

UNITED STATES PATENT OFFICE 1,925,614

COMBUSTION ENGINE

Nicholas Straussler, London, England, assignor to Bendix Aviation Corporation, Chicago, Ill., a corporation of Delaware Application September 22, 1930
Serial No. 483,680

12 Claims. (Cl. 123—32)

This invention relates to internal combustion engines preferably to internal combustion engines of the self ignition type.

One of the objects of the present invention is to provide a novel apparatus for supplying fuel and air to the cylinders of an internal combustion engine.

Another object of the present invention is to provide a novel apparatus for injecting liquid fuel into the cylinders of an internal combustion engine which is operated by the compression within the cylinder.

Another object of the present invention is to provide a novel apparatus for separately supplying fuel and air to the cylinders of an internal combustion engine which injects the fuel into the cylinders at a high velocity insuring sufficient penetration to distribute the fuel throughout the combustion chamber.

Another object of the present invention is to provide a novel apparatus for controlling the air admission, exhaust, and injection of a liquid fuel into the cylinders of an internal combustion engine which is operated in timed relation with the engine.

Another object of the present invention is to provide a novel apparatus for controlling the air admission, exhaust, and injection of a liquid fuel into the cylinders of an internal combustion engine, which is operated by both a driven member of the engine and by the compression within the cylinder.

Another object of the present invention is to provide a novel apparatus for controlling the admission, exhaust and injection of a liquid fuel into the cylinders of an internal combustion engine, which is rugged, simple, compact and efficient for the purpose intended.

The above and other objects will appear more fully hereinafter in the detailed description of the invention. One structural embodiment of the invention only is shown in the accompanying drawings wherein like reference characters refer to like parts throughout the several views. It is to be expressly understood, however, that the drawings are for the purpose of illustration only and are not designed as a definition of the limits of the invention, reference being had for this purpose to the appended claims.

In the drawings:

Fig. 2 is a view of the disassembled structure of Fig. 1; and

Figure 1:
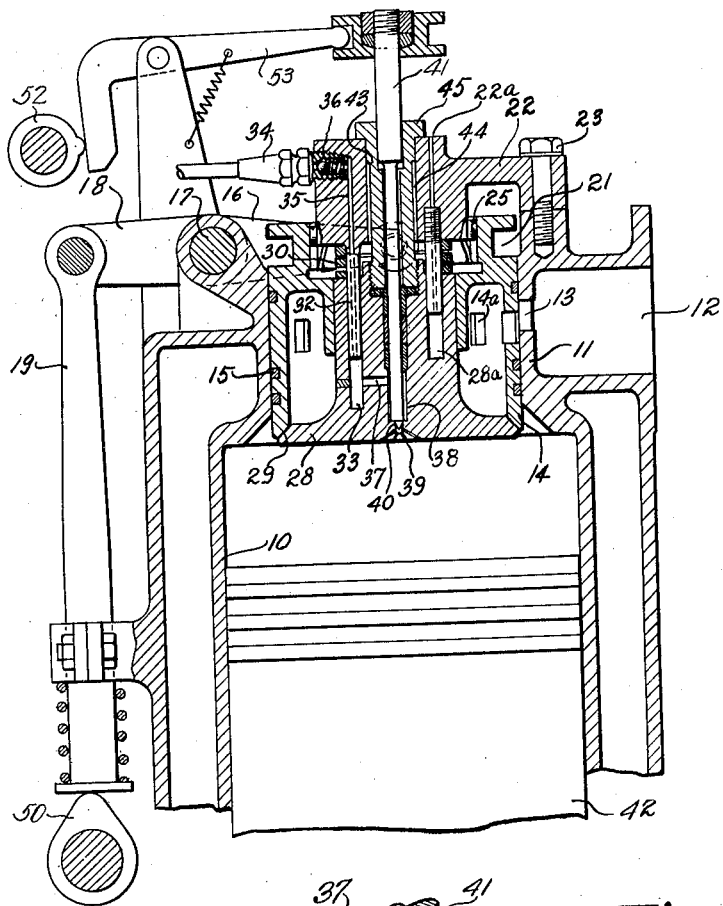
Fig. 1 is an axial view in section of one embodiment of the invention.
Figure 3:
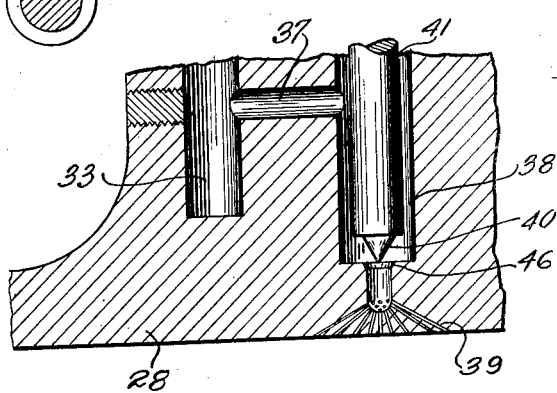
Fig. 3 is an enlarged detailed view of a portion of the structure shown in Fig. 1.

In the form shown, the structure of the present invention is associated with an engine cylinder 10 having a reduced portion or sub-cylinder 11 at the upper end thereof. Preferably, the cylinder block is so formed as to provide a substantially semi-circular recess or passageway 12 exteriorly of and partially surrounding the wall of the sub-cylinder 11, the interior of the latter being at times in communication with the passageway 12 through spaced openings or apertures 13. The passageway 12 may lead directly to atmosphere or a suitable device, not shown, may be mounted on the cylinder head adjacent the mouth of passageway 12 to deflect the exhaust of the engine or deliver the same to any point desired.

A mechanism is provided for controlling the communication between passageway 12 and the interior of the sub-cylinder 11, and is preferably in the form of a sleeve valve 14 of cylindrical shape that is fitted into the sub-cylinder 11 and carries compression rings 15 for insuring a tight fit. Spaced apertures 14a in the valve between the rings 15 are adapted to register with the spaced openings 13 in one position.

An actuating means is provided for giving the valve sleeve 14 a combined axial and oscillative movement relative to the sub-cylinder 11. In the form shown, the actuating means is comprised of a forked lever 16 supported by a rock-shaft 17 mounted on the cylinder block that is adapted to be intermittently oscillated in accordance with the timing of the engine. This movement is effected by operatively connecting lever 16 with a suitable rotating member of the engine such as a cam, 50, by means of a link 19 pivotally connected to the arm 18 of said lever. Lever 16 is operatively connected with valve member 14 by inwardly extending lugs 20 (Fig. 2) adapted to extend into an annular recess 21 provided at the upper end of said valve member. A stationary member or cylinder head 22 is mounted on the upper end of the block and is detachably fixed thereto by suitable means, such as screws 23. Member 22 is provided with a part 24 which extends downwardly into the upper end of the valve member 14 and is provided at its lower end with a plurality of projections 25 that extend into a spiral track 26 formed within the upper portion of said sleeve valve member 14.

Rotation of the lever 16 in a counter-clockwise direction will move the valve member 14 upwardly and the cooperating projections 25 positioned within the spiral track 26 will rotate the member 14. In this position of the valve member the apertures 14a are in register with the apertures 13 of the sub-cylinder 11 and communication between the opening 12 and cylinder 11 is obtained. When the lever 16 is rotated in a clockwise direction the valve member 14 is moved downwardly and turned so that the apertures 14a and 13 are out of registering alignment preventing communication between the opening 12 and sub-cylinder 11. As the rotation of the lever 16 is directly dependent upon the position of the engine driven member, the valve 14 is actuated in timed relation with the engine and the arrangement is such that the apertures 13 and 14a are in register during the exhaust and intake strokes of the engine, but are out of register during the compression and power strokes.

In the embodiment illustrated a novel means is provided for controlling the admission of air and exhaust from the cylinder 10 by controlling the communication between the same and the sub-cylinder 11. This means consists of a poppet valve member 28 positioned within the sleeve member 14 and having a beveled face on its head cooperating with a beveled face on the lower end of the sleeve valve 14. These beveled faces 29 during part of the engine cycle tightly fit with each other and form an end wall or head for the cylinder 10. The valve 28 has a body portion extending into the sleeve valve 14 which is provided with a central bore throughout the greater part of its length. The end of the bore opposite from the head is recessed and interiorly threaded for receiving the threaded end of a tubular bushing 43 extending through a centrally located aperture 44 in the stationary member 22. An annular shoulder 45 on the opposite end of the bushing 43 is adapted to seat on the upper side of the head 22 and limit the downward movement of the valve 28. A spring 30 is positioned between the end of the body portion of the valve and member 22 for normally holding the valve 28 in an extended downward position. With this structural arrangement the sleeve valve 14 may be moved by lever 18 relative to the poppet valve 28 allowing a communication between the passageway 12 and the cylinder 10 during the admission and exhaust stroke of the engine.

Rotation of the valve 28 is prevented by a connection with stationary head member 22. This connection comprises a stud 31 threaded into the under side of the head 22 and extending into an opening 28a, in the valve body 28, and a reduced depending portion 32 of member 22 extending into a recess or well 33 formed in the body portion of the valve 28. An air vent 22a extends through the stud 31 and stationary member 22 for connecting the opening 28a with the atmosphere to allow free sliding of the two elements.

Novel means are provided for supplying a liquid fuel to the working cylinder 10 with a very high velocity so that a finely atomized fuel spray is obtained in the engine cylinder of sufficient penetration to distribute the fuel throughout the combustion chamber. To this end fuel is supplied from any available source through connection 34 and a passage 35 in the depending part 32 to the well 33 in the valve 28, constituting a fuel chamber. The passageway 35 is provided with a one way valve 36 for allowing a free passage of the fuel in one direction but preventing the fuel from reentering the connection 34. The fuel well 33 may be opened to communicate with the cylinder 10 through passageways 37, 38 and a plurality of orifices 39 extending from a conical valve seat formed in the bore of the body portion of the valve 28. The orifices 39 are so disposed as to produce a conical spray of fuel into the cylinder 10.

A needle valve 40 is provided for controlling the communication of the fuel chamber 33 with the cylinder 10 which has a stem 41 extending through the central bore of the valve body 28 and hollow bushing 43. A suitable packing 47 is interposed between the stem and body of the valve 28 for preventing the passage of fuel therebetween. This needle valve 40 is also connected with a driven member of the engine at the end of the stem extending beyond the bushing. This connecting means, shown diagrammatically, may be in the form of a cam 52 and lever 53 for operating the valve 40 to open position at a predetermined time during the compression stroke of the piston 42 and closing the same shortly before the close of the compression stroke.

With such a structural arrangement for injecting fuel into the cylinder, the air within cylinder 10 during the compression stroke acts upon the head of the poppet valve 28 until sufficient pressure is developed to overcome the action of the spring 30. At this time the pressure within the cylinder 10 is increasing rapidly and will move the poppet valve 28 upwardly with considerable force and exert a tremendous pressure on the liquid fuel trapped in the chamber 33. As the valve 36 closes and the valve 40 opens the fuel will be forced through the orifices 39 and into the cylinder 10 in the form of a spray with a very high velocity.

In operation, at the beginning of the exhaust stroke, the sleeve valve 14 is moved upwardly by the engine driven member acting on the lever 16, and rotated a predetermined amount by the projections 25 extending into the spiral track 26 so that the openings 14a are in registering alignment with opening 13 and the beveled faces on the sleeve and valve members are separated. During this exhaust stroke a complete scavenging of the cylinder 10 is effected through the opening between valves 14 and 28 and the ports 14a, 13 and 12. The opening 12, being in direct contact with the air, immediately supplies fresh air to the cylinder 10 upon the next suction stroke of the piston 42 as valve 14 remains in its uppermost position and the cooperating openings 13 and 14a remain in register one with the other during these two strokes. After completion of the suction or intake stroke of the piston, the engine driven member operates and moves the valve sleeve 14 downwardly until the apertures 14a are out of register with the apertures 13, and a compression of the air takes place in the cylinder. During the compression stroke, an engine driven member operates to open the valve 40 as above stated, and the compressed air within the cylinder acting on the head of the poppet valve 28 moves the same upwardly against the pressure of the spring 30. As the extension 32 of the head 22 is held stationary, the fuel within the well 33 is prevented from reentering the connection 34 by valve 36, and being subjected to the multiplied force of compression acting on the small area of the extension 32, enters the cylinder 10 through passageways 37, 38 and orifices 39 at a high velocity and in a finely atomized spray. The fuel mixture within the cylinder is then exploded either by self ignition or auxiliary means and a power stroke given to the piston completing the cycle.

It will now be obvious to those skilled in the art that the whole force caused by the pressure within the cylinder 10 acting on the whole area of valve 28 is directed to the very small area of the fuel well 33, and produces a tremendous hydraulic force and velocity to the fuel passing through the orifices that is most desirable in engines of the self ignition type. It will also be apparent that a simple and compact apparatus has been provided that efficiently controls the admission of air, exhaust, and injection of a liquid fuel into the cylinder of an internal combustion engine in timed relation with the engine, that is positive in operation. The above described valve mechanism also makes possible the proper operation of an engine employing a mixture that is surprisingly leaner than the fuel mixture heretofore provided for a large engine.

While the embodiment of the invention illustrated is adapted for use in an engine of self ignition type, it will be obvious to those skilled in the art that the invention may readily be employed in other types of engines. Various other changes, modifications, substitutions, additions and omissions may be made in the device without departing from the spirit and scope of the invention as defined in the appended claims.

What is claimed is:

1. In an internal combustion engine the combination of a cylinder, a cylinder head including means for separately supplying air and fuel to said cylinders, said means comprising an engine-operated mechanism for supplying air to said cylinder, and compression-operated means for supplying fuel to said cylinder.

2. In an internal combustion engine, the combination of a cylinder, means for supplying air to said cylinder, an engine driven member for controlling the said means, and means for supplying fuel to said cylinder operated by the compression of air within the cylinder.

3. In an internal combustion engine the combination of a cylinder, operable means for controlling the air admission and exhaust to said cylinder, an engine driven member for operating said means, means for supplying fuel to said cylinder operated by the compression of air within the cylinder, and means for controlling the fuel supply means.

4. In an internal combustion engine, the combination of a cylinder, engine driven means for controlling the air admission, exhaust and injection of fuel to said cylinder, said means comprising a stationary member, a movable member adapted to place said cylinder into communication with the atmosphere, and compression-operated means cooperating with said stationary member whereby fuel is injected into said cylinder when the latter is closed to the atmosphere.

5. In an internal combustion engine, the combination of a cylinder, a cylinder head forming a sub-cylinder, a member within the sub-cylinder for controlling the air admission and exhaust, an engine driven member for operating said member, a second member within the sub-cylinder cooperating with the first named member for controlling the air admission and exhaust and operated by the compression in the cylinder to inject fuel.

6. In an internal combustion engine, the combination of a cylinder, a cylinder head forming a sub-cylinder, openings in the sub-cylinder, a cylindrical sleeve within the sub-cylinder, a plunger within said sleeve having a head cooperating with the open end of said sleeve, a resilient means for normally holding the plunger in a fixed position with respect to said sleeve, an engine driven member for operating said sleeve and controlling the air admission and exhaust, said plunger being moved by the compression in the cylinder to inject fuel.

7. In a combustion engine, the combination of a cylinder, a cylinder head including combined valve and fuel injection means for separately supplying fuel and air to said cylinder, engine driven mechanism for actuating said valve, and compression-operated means for actuating said fuel injection means, the last said means including a movable member having a fuel well therein, and a stationary member within said well whereby upon axial movement of said movable member fuel is forced from said well into said cylinder.

8. In an internal combustion engine the combination of a cylinder, a cylinder head including a combined valve and fuel injection means for separately supplying air and fuel to said cylinder, engine driven means for actuating said valve, compression-operated means for actuating said fuel injection means, said last mentioned means including a movable member having a fuel well therein, and a stationary member within said well, whereby upon axial movement of said movable member fuel is forced from said well, and engine-operated means for controlling the admission of said fuel into said cylinder.

9. In an internal combustion engine, the combination of a main cylinder, a sub-cylinder having openings therein, a member within said sub-cylinder having cooperating openings therein, and engine-operated means for moving said member with a combined axial and oscillatory motion whereby the openings in said member register with the openings in said sub-cylinder for placing the main cylinder in communication with the atmosphere during the admission and exhaust strokes, and a pressure actuated valve seated in the member for closing the cylinder to atmosphere during the compression and power strokes of the engine.

10. In an internal combustion engine, a cylinder, a cylinder head, a movable sleeve in said cylinder head, a movable plunger within said sleeve having a valve portion coacting with the sleeve to close the cylinder to atmosphere at a predetermined cylinder pressure, a fuel well in said plunger communicating with said cylinder, a stationary piston extending into said well, said plunger being adapted to be bodily moved by the compression in said cylinder whereby the fuel in said well will be forced into the cylinder by the stationary piston.

11. In an internal combustion engine, a cylinder, a cylinder head, a movable plunger within said head, a sleeve surrounding said plunger, a fuel well in said plunger, a spray nozzle in said plunger opening into said cylinder, communicating means between said well and said nozzle, a stationary piston extending into said well, a resilient means for normally holding the plunger in its normal position, said plunger being adapted to be bodily moved by the compression in the cylinder to force the fuel from the well and into the cylinder through the spray nozzle, said plunger having an enlarged portion adapted to coact with the sleeve to close the cylinder to atmosphere when the pressure therein exceeds a predetermined value.

12. In an internal combustion engine, a cylinder, a cylinder head, a plunger within the head, a valve sleeve surrounding the plunger, a fuel well in the plunger, a stationary piston extending into said fuel well, means for connecting the fuel well with the cylinder and forming a valve seat, a valve cooperating with the valve seat and operated in timed relation with respect to the engine to allow the fuel to enter the cylinder when the plunger is bodily moved by the compression in the cylinder, said plunger having a portion adapted to coact with the sleeve to close the cylinder to atmosphere at a predetermined cylinder pressure.

NICHOLAS STRAUSSLER.